United States Patent
Salz et al.

[19]

[11] Patent Number: 5,855,108
[45] Date of Patent: Jan. 5, 1999

[54] ALARM MONITOR FOR BELT SLIP IN A COMBINE

[75] Inventors: Maury V. Salz, Davenport, Iowa; Dale W. Panoushek, Orion; Eric L. Walker, East Moline, both of Ill.

[73] Assignee: Case Corporation, Racine, Wis.

[21] Appl. No.: 602,632

[22] Filed: Feb. 16, 1996

[51] Int. Cl.$^6$ .................................................. A01D 75/18
[52] U.S. Cl. .................. 56/10.2 G; 56/10.3; 56/DIG. 15
[58] Field of Search ............................ 56/10.2 F, 10.2 G, 56/10.2 H, 10.3, DIG. 15, 6, 13.5, 13.9, 15.1, DIG. 2, 294; 364/424.01, 424.07

[56] References Cited

U.S. PATENT DOCUMENTS

| | | |
|---|---|---|
| 4,282,702 | 8/1981 | McBee . |
| 4,321,991 | 3/1982 | Teijido et al. . |
| 4,332,127 | 6/1982 | Staiert et al. .......................... 56/10.2 H |
| 4,400,930 | 8/1983 | Huhman et al. . |
| 4,548,027 | 10/1985 | Maeoka ................. 56/10.2 G |
| 4,603,543 | 8/1986 | Cornell ................. 56/10.2 N |
| 4,893,241 | 1/1990 | Girodat et al. .................... 56/10.2 G X |
| 5,025,614 | 6/1991 | Orsborn et al. ...................... 56/10.2 G |
| 5,394,678 | 3/1995 | Lonn et al. .......................... 56/10.2 H |
| 5,430,997 | 7/1995 | O'Halloran et al. ............. 56/10.2 H X |

Primary Examiner—Terry Lee Melius
Assistant Examiner—Robert Pezzuto
Attorney, Agent, or Firm—Foley & Lardner

[57] ABSTRACT

An agricultural vehicle, tractor, or combine includes a slip monitoring system for determining whether a slip condition exists. The agricultural vehicle includes a combustion engine which indirectly drives a piece of equipment such as a rotor. The rotor is mechanically coupled to the engine via a rotor-drive belt system including two belts and four pulleys. The slip monitoring system analyzes the speed of the rotor and the speed of the engine to determine if there is slippage between the belts and the pulleys. The system determines when a slip condition exists by comparing the ratio of the rotor speed to the engine speed to the ratio of the rotor speed to the engine speed under no-load conditions. When the system determines that the ratio is below the threshold, a display provides visual and audio warnings of the slip condition. The monitoring system is implemented as a software subroutine.

20 Claims, 4 Drawing Sheets

ALARM MONITOR FOR BELT SLIP IN A COMBINE

FIELD OF THE INVENTION

The present invention relates to a combine or agricultural vehicle. More particularly, the present invention relates to a control system which monitors the slip between a mechanical power source and a piece of equipment driven by the mechanical power source.

BACKGROUND OF THE INVENTION

Agriculture equipment such as a combine or agricultural vehicle utilizes a head or other implement to perform various operations on a field. Combines often employ an implement such as a harvester or header attached to a feeder to harvest a crop or other plant-related matter. The feeder receives the cut or harvested crop from the header and provides the harvested crop to various pieces of equipment within the combine which perform assorted operations on the harvested crop such as sorting, separating, spreading, storing, or other agricultural functions.

Generally, combines have a combustion engine or mechanical power source indirectly driving the various pieces of equipment which operate on the harvested crop. The various pieces of equipment can include, but are not limited to, a feeder which receives the harvested crop from the header and transports the harvested crop to within the combine, a rotor which receives the harvested crop from the feeder and spins axially to thresh or separate the seed from the non-seed material of the harvested crop, a shoe shaker which separates additional seed from the non-seed material from the rotor, a straw spreader which spins to throw the non-seed material received from the shoe shaker out of the combine, a tailings elevator which conveys seed from the shoe shaker to the rotor, a clean grain elevator which transports seed from the rotor to the grain storage tank or external grain storage area, a discharge beater, a chopper which cuts the non-seed material for spreading by the straw spreader, a cleaning fan which provides cross air movement across the seed material for cleaner seed material as it is conveyed through the combine, a rotary air screen fan which provides cooling for the combustion engine, as well as other types of devices which are driven by the engine. These pieces of equipment (e.g., the rotor) are often indirectly driven via a chain, axle, gear mechanism, or belt such as a rotor-drive belt.

As the load increases on the piece of equipment such as the rotor, the engine speed and rotor speed both decrease proportionally. If the load is great enough, the load overcomes the forces between the rotor-drive belt and the engine or between the rotor-drive belt and the rotor and causes the rotor-drive belt to slip. Sustained loads at these high levels can make the belt slip even more, thereby resulting in no torque being transferred from the engine to the rotor and consequently causing a plugged or jammed rotor. When the rotor plugs, the harvested crop cannot be transported or operated on by the rotor and the combine fails to efficiently harvest the crop.

Generally, it is useful to provide the operator with indicia of whether the coupling mechanism or belt which is indirectly driving the various pieces of equipment such as the rotor is slipping so the operator can take appropriate action to avoid a plug condition. For example, when the rotor-drive belt begins to slip, the operator can reduce the ground speed of the combine, thereby alleviating the load on the rotor. If the operator is able to reduce ground speed before the plug condition exists, the load on the rotor is decreased and the rotor can successfully operate on the harvested crop within it.

Heretofore, combines have included slip alarms which provide an audible or visual warning of a slip condition. These prior art slip alarms monitor rotor speed to determine whether the rotor drive belt is potentially slipping. In these prior art systems, the slip warning was provided when the rotor speed fell below a threshold which represented a percentage of the unloaded rotor speed. However, relying solely on one speed parameter such as the rotor speed to determine a slip condition is inaccurate and more particularly relying solely on a rotor speed parameter is imprecise especially as the belt wears. As the belt wears, the rotor-drive belt tends to slip at a higher rotor speed. Thus, these prior art slip alarms cannot alert the operator in an appropriate amount of time if the belt is worn because they are not able to compensate for belt wear. Accordingly, there is a need for a more accurate slip monitoring system. Further, there is a need for a slip warning system which can adequately warn of slip conditions over the operating life of a belt in a combine.

SUMMARY OF THE INVENTION

The present invention relates to a slip monitoring system for use with farm machinery. The farm machinery includes a mechanical power source operatively coupled to a piece of equipment to drive the piece of equipment. The slip monitoring system includes an equipment speed sensor in a communication with the piece of equipment, a power source speed sensor in communication with the mechanical power source, and a control circuit communicating with the equipment speed sensor and the power source speed sensor. The equipment speed sensor provides an equipment speed signal indicative of the speed of the piece of equipment, and the power source speed sensor provides a power source speed signal indicative of the speed of the power source. The control circuit receives the power source speed signal from the power source speed sensor and the equipment speed signal from the equipment speed sensor and generates a slip warning in response to the equipment speed signal and the power source speed signal.

The present invention also relates to an agricultural machine including an engine, a rotor, a slip alarm, a rotor speed sensor means, an engine speed sensor means, and a control means. The rotor is indirectly mechanically coupled to the engine. The slip alarm is capable of providing indicia of a slip condition in response to a slip signal. The rotor speed sensor means provides a rotor speed signal, and the engine speed sensor means provides an engine speed signal. The control means generates the slip signal in response to the engine speed signal and the rotor speed signal.

The present invention further relates to a method of generating a slip warning signal for agricultural machinery. The agricultural machinery includes an engine indirectly driving a piece of equipment. The method includes steps of receiving an equipment speed signal indicative of the speed of the piece of equipment, receiving an engine speed signal indicative of the speed of the engine, and generating a slip warning signal in response to the equipment speed signal and the engine speed signal.

In one aspect of the present invention, the slip monitoring system provides a visual display and audio indication of a slip condition associated with a rotor-drive belt system coupled between an engine and a piece of equipment. In another aspect of the present invention, the slip monitoring system generates a slip warning in response to both the engine speed and the rotor speed. Preferably, the slip warning is generated in response to the ratio of the rotor speed and the engine speed being less than a threshold. The threshold is calculated as a percentage of the ratio of the rotor speed and the engine speed under a no-load condition (e.g., when there is no harvested crop in the rotor).

In yet another aspect of the present invention, the slip monitoring system is implemented as a software subroutine within a control algorithm for performing and controlling the various functions of a combine. The present invention advantageously monitors rotor speed and engine speed to determine the most accurate reflection of whether a slip condition exists. The slip warning is preferably generated when the ratio of the rotor speed and the engine speed is less than a percentage of the ratio of the rotor speed and engine speed during a no-load condition. The percentage is a sensitivity factor which can be adjusted by the operator over the life of the rotor-drive belt system. Control instrumentation within the combine allows the user to adjust the sensitivity factor. The slip warning system can be utilized with any power source which indirectly drives a device such as a fan, a straw spreader, a tailings elevator, a clean grain elevator, a rotary air screen, a discharge beater, or a chopper.

DETAILED DESCRIPTION OF THE PREFERRED EMBODIMENT

Figure 1:
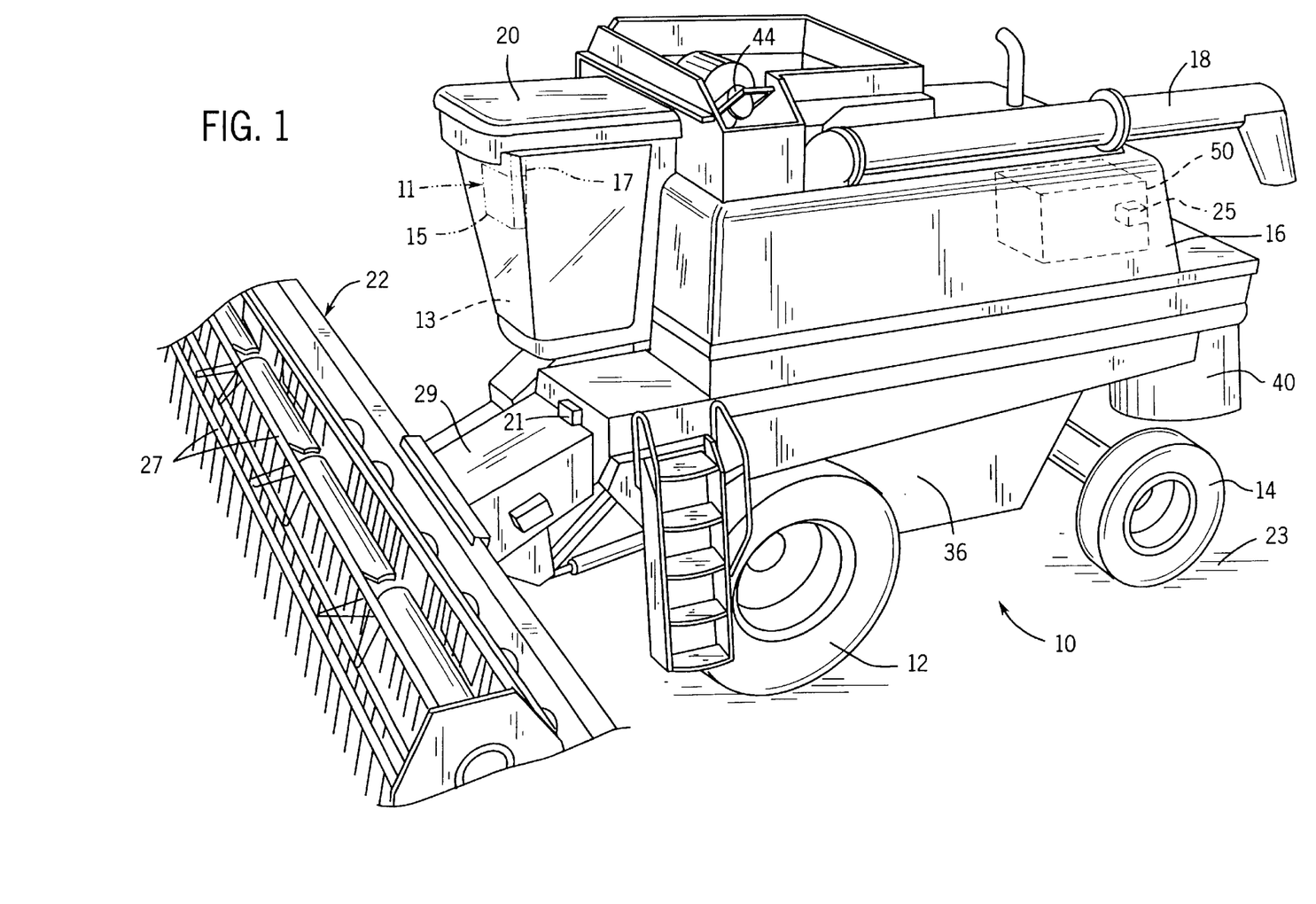
FIG. 1 illustrates an agricultural vehicle including a slip warning system.

Referring to FIG. 1, an agricultural vehicle 10 includes a pair of drive wheels 12 located at the front end of vehicle 10, a pair of steerable wheels 14 located at the rear end of vehicle 10, a machinery and grain storage compartment or housing 16, a grain elevator and grain chute 18, an operator cab 20, and a support frame (structure) for joining and supporting the above-listed components. (By way of example only, vehicle 10 may be a combine of the type manufactured by Case Corporation having Model No. 1660.)

Attached to a feeder 29 at the front end of the frame of vehicle 10 (i.e., the front-most end of vehicle 10 along its forward direction of travel during harvesting) is a header 22 such as a grain harvesting header. (By way of example, header 22 could also be a Combine Corn Head Series 1000 sold by Case Corporation.) Header 22 is positioned relative to vehicle 10 and/or the surface 23 upon which vehicle 10 is moving (i.e., the ground from which the respective plant related matter, grain or vegetation, is being harvested). Header 22 includes a reel 27 for gathering the cut crop. The harvested crop is provided to feeder 29 which includes an auger or conveyor mechanism 33 (see FIG. 2) for transporting the harvested crop from header 22 to within combine 10.

Agricultural vehicle 10 includes control instrumentation 11 mounted in an interior 13 of cab 20. Instrumentation 11 includes a slip warning or slip monitoring system 15 which provides an audible indication or visual warning on display 17 of whether a slip condition exists as determined by slip monitoring system 15. Display 17 is preferably located within interior 13 of cab 20 at approximately eye level of an operator. Display 17 can be provided on a vertical post on the right side of interior 13 of cab 20.

Display 17 can include a speaker or other audio alarm to provide the audio indication of the slip condition. Display 17 can also include a liquid crystal display, light emitting diodes (LEDs), incandescent lamps, cathode ray tubes (CRTs), or other display devices to provide the visual indicia (e.g. warning) of the slip condition. The components and operation of slip monitoring system 15 are discussed in more detail below with reference to FIGS. 3 and 4.

With reference to FIG. 1, slip monitoring system 15 receives a rotor speed signal from a rotor speed sensor 21 and an engine speed signal from an engine speed sensor 25. Rotor speed sensor 21 is preferably a reluctance sensor located above feeder 29. Sensor 21 is in communication with a rotor 35 (see FIG. 2) located in compartment 36 of vehicle 10 so sensor 21 can appropriately determine the speed of rotation of rotor 35. Sensor 25 is preferably a reluctance sensor in communication with a pulley (not shown) coupled to a hydrostatic pump (not shown) of an engine 50 (shown in phantom lines within housing 16). Engine speed sensor 25 provides a signal representative of the speed at which engine 50 is rotating. Slip monitoring system 15 utilizes the rotor speed signal and the engine speed signal to determine if a slip condition exists.

Figure 2:
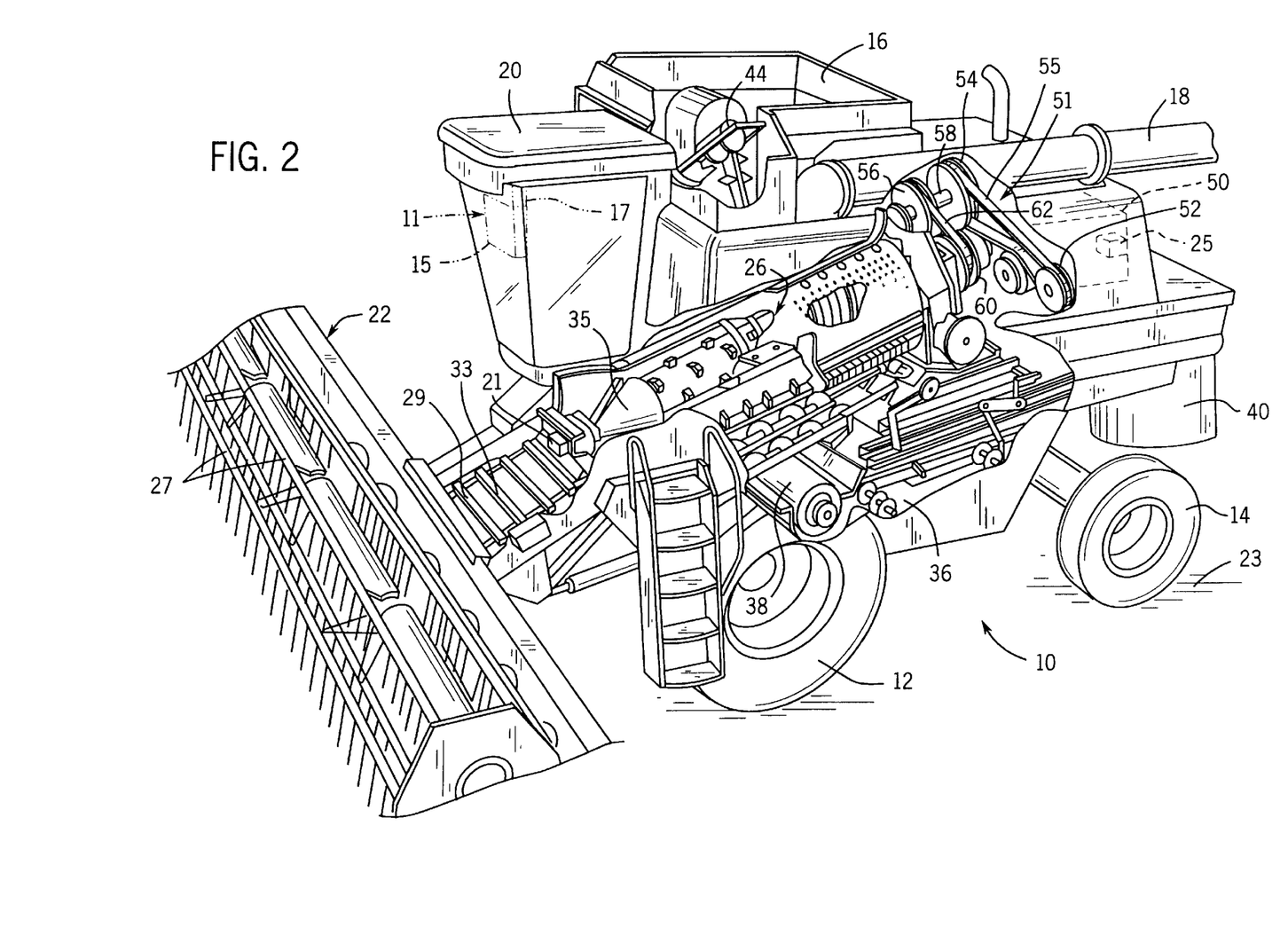
FIG. 2 is a cut-away schematic representation of the agricultural vehicle illustrated in FIG. 1 showing a rotor-drive belt system which is mechanically coupled to an engine and a rotor of the agricultural vehicle.

With reference to FIG. 2, vehicle 10 includes engine 50 and rotor 35 (of a rotor assembly 26). Slip monitoring system 15 is described below for use with a piece of agricultural equipment such as rotor 35 located within compartment 36 of agricultural vehicle 10. Although slip monitoring system 15 is described with respect to the operation of rotor 35, slip monitoring system 15 can be utilized with any piece of equipment driven by engine 50 or another power source in vehicle 10. For example, slip monitoring system 15 may be utilized with an unloader tube or chute 18, feeder 29, a cross-flow fan 38, a straw spreader 40, a tailings elevator (not shown), a clean grain elevator 44, or any devices or apparatus driven by engine 50.

Engine 50 is indirectly coupled to rotor 35 via a rotor drive belt system 51. Engine 50 provides mechanical power for vehicle 10 via a shiv or driving pulley 52 which is part of system 51. Driving pulley 52 is coupled to a driven pulley 54 via a belt 55. The rotational motion of pulley 54 is utilized to drive various pieces of agricultural equipment on vehicle 10 such as feeder 29, fan 38, spreader 40, tailings elevator (not shown), and elevator 44. Driven pulley 54 is coupled to a driving pulley 56 via an axle 58. Driving pulley 56 is coupled to a driven pulley 60 via a belt 62. Driven pulley 60 is coupled to rotor 35 and imparts rotational motion on rotor 35. Therefore, rotor 35 is in mechanical communication with engine 50 via rotor drive belt system 51 which includes belts 55 and 62 and pulleys 52, 54, 56, and 60.

The operation of agricultural vehicle 10 including slip monitoring system 15 is described as follows with reference to FIG. 2. A harvested crop or other plant matter is provided from reels 27 to feeder 29. Feeder 29 conveys the harvested crop to rotor 35. Rotor 35 is a single, longitudinal shaft or mechanism which rotates to provide a gentle, repetitive threshing and separation operation on the harvested crop from feeder 29. Rotor 35 serves to separate the harvested crop such as wheat or grain into seed material and non-seed material as rotor 35 rotates. The seed material is generally eventually provided into grain and storage compartment 16 or to grain chute 18. The non-seed material is discharged from vehicle 10 by straw spreader 40.

When the amount of the harvested crop provided to rotor 35 via feeder 29 is increased, the load on rotor 35 is increased. When the load on rotor 35 is increased, the engine speed of engine 50 and the rotor speed of rotor 35 both decrease proportionately. When the load on rotor 35 is great enough to overcome any of the forces between belts 55 and 62 and pulleys 52, 54, 56, and 60 of system 51, belt 55, belt 62, or both belts 55 and 62 eventually slip, resulting in no torque being transferred from engine 50 to rotor 35. The lack of torque being transferred from engine 50 to rotor 35 causes rotor 35 to plug or jam with the harvested crop.

Slip monitoring system 15 advantageously generates a slip warning signal for use by display 17 when the ratio of the rotor speed and engine speed falls below a threshold. The threshold represents a slip condition (e.g., when either or both of belts 55 and 62 are slipping). The generation of the slip warning signal and operation of slip monitoring system 15 are discussed below in more detail with respect to FIGS. 3 and 4.

Control instrumentation 11 (FIG. 3) includes a microprocessor (not shown) such as a 68HC11 microcontroller manufactured by Motorola including a memory device (not shown) such as an EEPROM for storing data. Rotor speed sensor 21 is preferably a reluctance sensor located proximate rotor 35 which is coupled to an interrupt input on the microprocessor. The microprocessor is programmed with an interrupt subroutine which tracks the number of peaks provided to system 15 by rotor speed sensor 21. The positive peaks of the rotor speed signal interrupt the microprocessor and cause the microprocessor to begin the interrupt subroutine. The interrupt subroutine causes the microprocessor to calculate the speed at which rotor 35 is operating (e.g., the rotor speed).

Figure 3:
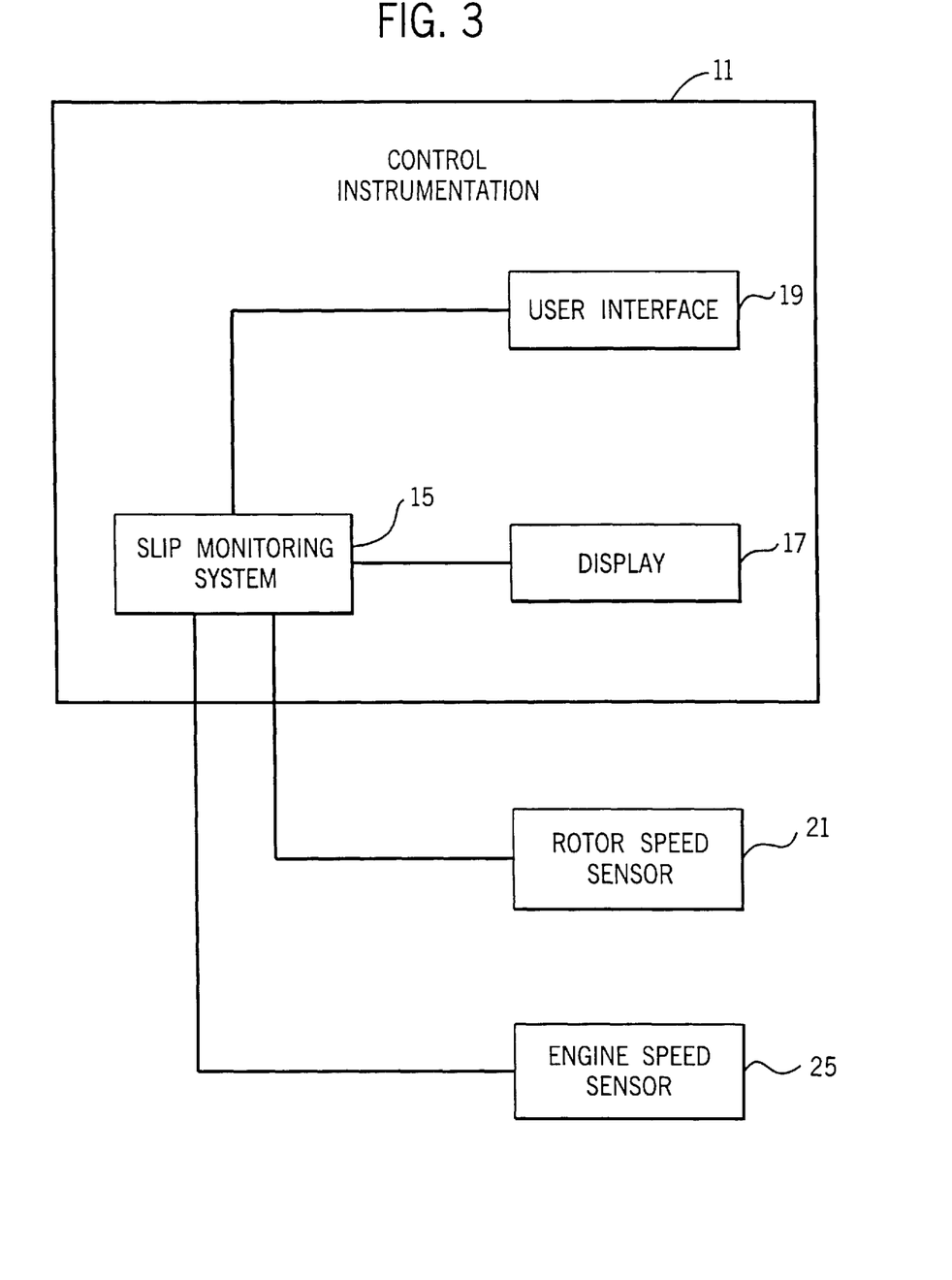
FIG. 3 is a general schematic block diagram of a slip monitoring system for the agricultural vehicle illustrated in FIG. 1 in accordance with the preferred exemplary embodiment of the present invention.

Engine speed sensor 25 is preferably a reluctance sensor located proximate a hydrostatic pump (not shown) associated with engine 50. Engine speed sensor 25 magnetically senses the speed of rotation of engine 50 by sensing the speed of rotation of the pulley (not shown) coupled to the hydrostatic pump (not shown). Alternatively, sonic, radar, radio wave, or optical sensors may be utilized to determine the speed of rotor 35 or engine 50. The microprocessor preferably includes an interrupt input coupled to the engine speed sensor 25. The microprocessor is programmed with an interrupt subroutine which tracks the number of peaks provided to system 15 by engine speed sensor 25. The positive peaks of the engine speed signal interrupt the microprocessor and cause the microprocessor to begin the interrupt subroutine. The interrupt subroutine causes the microprocessor to calculate the speed at which engine 50 is operating (e.g., the engine speed).

The operator of vehicle 10 is able to input various information into system 15 through a user interface 19. User interface 19 may be a keyboard, push buttons, touch screen or other device utilized to provide information such as sensitivity of the system 15 to a slip condition or a slip alarm disable control (not shown). Such user input information is useful so the operator can tailor slip monitoring system 15 according to specific applications, belt wear, and operator preference.

When generating the slip warning signal, slip monitoring system 15 determines whether the ratio of the rotor speed and the engine speed is below a threshold. The threshold is determined by calculating the ratio of the rotor speed at no load and the engine speed at no load multiplied by a sensitivity factor. For example, equation 1 defines the threshold as:

$$\text{Threshold} = \frac{\text{RotorSpeed(NoLoad)}}{\text{EngineSpeed(NoLoad)}} \times \text{SensitivityFactor} \qquad (1)$$

System 15 calculates the threshold when rotor 35 is assumed to be under no-load conditions and hence when there is no slippage in rotor drive belt system 51 (FIG. 2).

The sensitivity factor is a percentage varying from 70 to 95 percent for rotor 35. For other pieces of equipment, the sensitivity factor can vary. For instance, the sensitivity factor for fan 38 is preferably 80 percent.

System 15 determines that rotor 35 is operating in a no-load condition by monitoring a separator switch (not shown) on user interface 19 and the engine speed of engine 50. The separator switch is utilized to enable the operation of slip monitoring system 15. When the separator switch is enabled and the engine speed is greater than 1,800 revolutions per minute (RPM) for at least four seconds, system 15 assumes that vehicle 10 is under a no load condition, calculates the threshold, and begins to actively monitor for a slip condition. Once the threshold is calculated, system 15 compares the ratio of the rotor speed and the engine speed with the threshold. If the ratio is greater than the threshold, system 15 determines that slip is not occurring in rotor drive belt system 51, and the slip warning signal is not provided. If the ratio is less than the threshold, system 15 determines that a slip condition may exist in rotor drive belt system 51 and the slip warning signal is provided to display 17.

Display 17 may indicate a slip condition in a variety of fashions. For example, display 17 may provide an audible alarm or lighted indicators. Preferably, display 17 flashes the rotor speed to indicate a slip condition and provides a continuous audible alarm in response to the slip warning signal. The rotor speed is flashed at one hertz to indicate a slip condition. The audible alarm and the flashing of the rotor speed can be deactivated by pressing the slip alarm disable control (not shown) on user interface 19. If the slip alarm disable control is depressed, the audible alarm is ceased immediately and the display 17 ceases flashing after an eight second delay.

Preferably, system 15 provides hysteresis to reduce on/off cycling of the slip warning signal. Hysteresis is provided by adjusting the threshold whenever the slip warning signal is provided or removed. Slip monitoring system 15 is disabled when the separator switch is disengaged or the engine speed falls below 1800 RPM.

Figure 4:
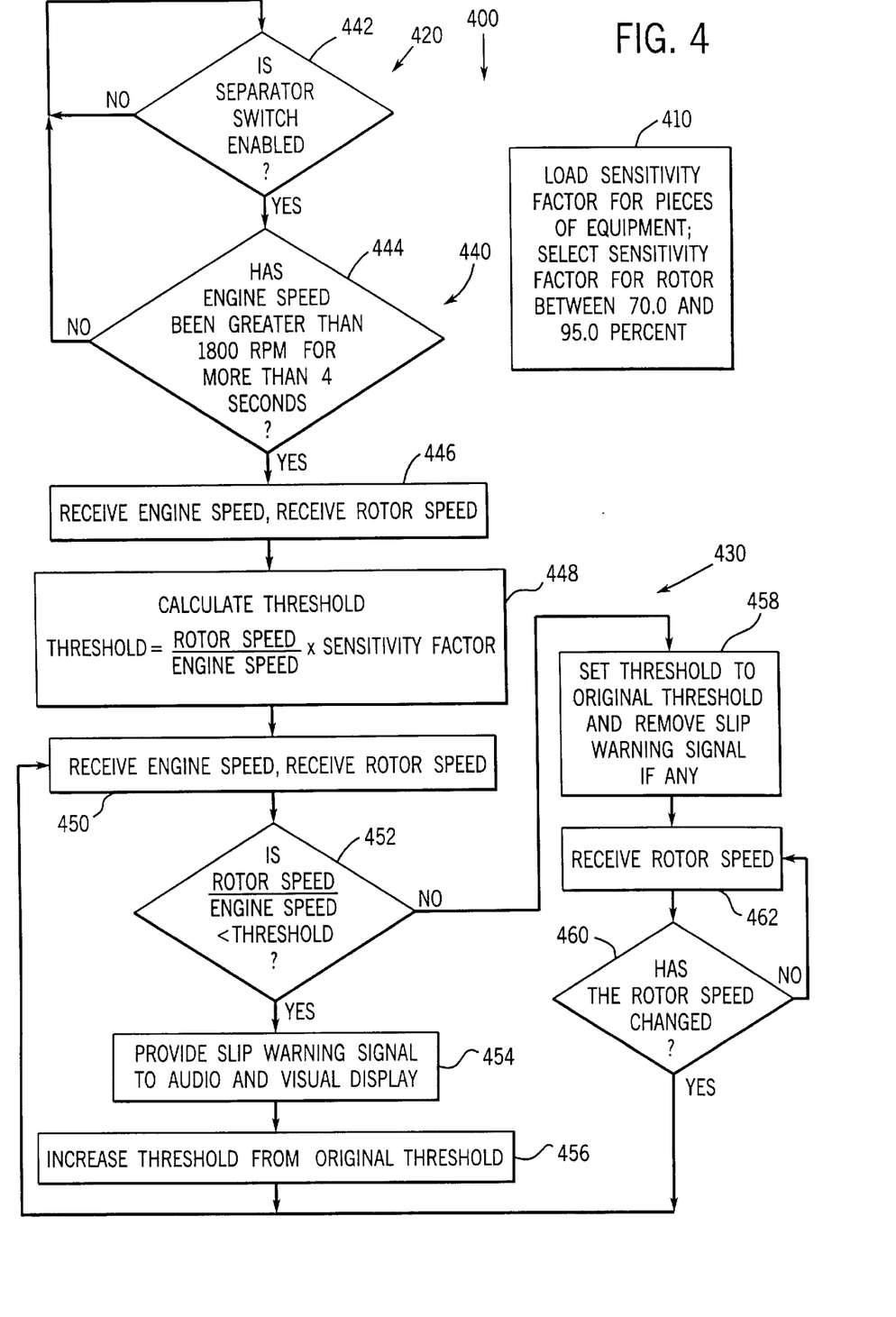
FIG. 4 is a general block diagram flow chart showing a subroutine utilized by the slip monitoring system illustrated in FIG. 3.

FIG. 4 shows a subroutine 400 for determining a slip condition for rotor 35 (FIG. 2) of vehicle 10. However, subroutine 400 can be modified to determine slip conditions for various pieces of equipment. Additionally, subroutine 400 is shown in a general exemplary sense and can be modified without departing from the scope of the invention. Subroutine 400 is implemented as part of other control algorithms operated by control instrumentation 11.

Subroutine 400 can be programmed in a known computer language such as assembly code and loaded into the microprocessor (not shown) within control instrumentation 11. Subroutine 400 includes an initialization subroutine 410 and a monitoring subroutine 420. With reference to FIGS. 1–4, the operation of subroutines 410 and 420 with respect to vehicle 10 is described as follows.

The operator of vehicle 10 provides particular initialization data during initialization subroutine 410 to enable subroutine 420 to appropriately determine whether a slip condition exists. Subroutine 410 is implemented whenever the user enters a program mode and initializes values for subroutine 420 by manipulating user interface 19. In subroutine 410, the user may program the sensitivity factor for rotor 35. Preferably, the sensitivity factor is chosen between 70 and 95 percent. The sensitivity factor can be adjusted over the lines of belts 55 and 62 in rotor drive belt system 51.

Subroutine 420 includes an active monitoring loop 430 and a threshold loop 440. Threshold loop 440 is comprised of steps 442, 444, 446, and 448. Active monitoring loop 430 is comprised of steps 450, 452, 454, 456, 458, 460, and 462.

In threshold loop 440, slip monitoring system 15, operating within control instrumentation 11, determines if the separator switch has been enabled. If the separator switch is enabled, system 15 advances to step 444. If the separator switch is not enabled, system 15 remains at step 442. At step 444, system 15 determines if the engine speed has been greater than 1800 RPM for more than four seconds. If the engine speed has been below 1800 RPMs in the last four seconds, system 15 returns to step 442. If the engine speed has been greater than 1800 RPM for more than four seconds, system 15 assumes that vehicle 10 and rotor 35 are under a no-load condition and begins calculation of the threshold by advancing to step 446.

At step 446, system 15 receives the engine speed and the rotor speed. At step 448, system 15 calculates the threshold as a ratio of the engine speed and the rotor speed multiplied by the sensitivity factor obtained in subroutine 410. After the threshold has been calculated, system 15 begins the active monitoring of rotor 35 for a slip condition in active monitoring loop 430.

At step 450, system 15 receives the engine speed and the rotor speed. At step 452, system 15 determines if the rotor speed divided by the engine speed is less than the threshold calculated in step 448 of loop 440. If the ratio is less than the threshold, system 15 provides the slip warning signal to display 17 at step 454. The slip warning signal causes display 17 to generate an audio alarm and visual indicia of the slip condition for the operator of vehicle 10. At step 456, the threshold is increased from two to six percent from the original threshold to provide hysteresis. The threshold is only increased once after the calculation of the threshold in step 448. Raising the threshold in step 456 reduces on/off cycling of the slip warning signal when the ratio of the rotor speed and the engine speed is close to the threshold. After step 456, system 15 returns to step 450 and active monitoring loop 430 is repeated.

If at step 452 of active monitoring loop 430 the ratio of the rotor speed and the engine speed is greater than the threshold, system 15 advances to step 458 and removes the slip warning signal if any has been provided by system 15. Also, at step 458, system 15 resets the threshold to the original value which was calculated at step 448, if it was increased in step 456 during the previous operation of loop 430. The threshold is reset to its original value to provide hysteresis for system 15.

At step 462, system 15 receives the rotor speed. If the rotor speed has changed from the previous rotor speed, system 15 advances to step 450 in active monitoring loop 430. If the rotor speed has not changed, system 15 returns to step 462. System 15 may be reset to the beginning of subroutine 420 at any time by disengaging the separator switch or reducing the engine speed below 1800 RPM.

It will be understood that the description above is of the preferred exemplary embodiment of the specific forms shown and described. For example, the control system is utilized with a rotor 35 used in grain harvesting; however, system 15 may also be utilized with other harvesting devices. Furthermore, depending upon the application, various types of sensors 21 and 25 may be utilized. Further still, system 15 may be implemented as a hardware device or as a software subroutine. The software subroutine can be embodied in a multitude of fashions. Other substitutions, modifications, changes, and omissions may be made in the design and arrangement of the preferred embodiment without departing from the spirit of the invention as expressed in the appended claims.

We claim:

1. A slip monitoring system for use with farm machinery, the farm machinery including a mechanical power source operatively coupled to a piece of equipment, the mechanical power source driving the piece of equipment, the slip monitoring system comprising:

an equipment speed sensor in communication with the piece of equipment, the equipment speed sensor providing an equipment speed signal indicative of an equipment speed of the piece of equipment;

a power source speed sensor in communication with the mechanical power source, the power source speed sensor providing a power source speed signal indicative of a power source speed of the mechanical power source;

a control circuit communicating with the equipment speed sensor and the source speed sensor, the control circuit receiving the power source speed signal from the power source speed sensor and the equipment speed signal from the equipment speed sensor; and wherein the control circuit calculates a threshold value based on the power source speed signal under a no-load condition, the equipment speed signal under the no-load condition and a sensitivity factor, generates a slip warning signal in response to the equipment speed signal and the power source speed signal compared to the threshold value, and adjusts the threshold value after generating the slip warning signal.

2. The slip monitoring system of claim 1, further comprising:

a user interface communicating with the control circuit, the user interface receiving the sensitivity factor represented by a percentage value based on the piece of equipment and wear of at least one belt coupled to the piece of equipment, the sensitivity factor being multiplied by a ratio of the power source speed signal under the no-load condition and the equipment speed signal under the no-load condition.

3. The slip monitoring system of claim 2 wherein the mechanical power source is a combustion engine and the piece of equipment is a rotating shaft.

4. The slip monitoring system of claim 1 wherein the control circuit generates the slip warning signal when a ratio of the equipment speed signal and the source speed signal falls below the threshold value, the threshold value being indicative of a slip condition between the mechanical power source and the piece of equipment.

5. The slip monitoring system of claim 1, wherein the threshold value is increased after a first generation of the slip warning signal and the threshold value is not increased after subsequent generations of the slip warning signal.

6. The slip monitoring system of claim 5, wherein the threshold value is increased in the range of two to six percent.

7. An agricultural machine, comprising:

an engine;

a rotor indirectly mechanically coupled to the engine;

a slip alarm capable of providing indicia of a slip condition in response to a slip signal;

rotor speed sensor means for providing a rotor speed signal;

engine speed sensor means for providing an engine speed signal; and control means for calculating a threshold value based on the engine speed signal under a no-load condition, the rotor speed signal under the no-load condition and a sensitivity factor, generating the slip signal in response to the rotor speed signal and the engine speed signal compared to the threshold value, and adjusting the threshold value after generating the slip signal.

8. The agricultural machine of claim 7 wherein the agricultural machine is a combine.

9. The agricultural machine of claim 7 wherein the slip signal is generated when a ratio of the rotor speed signal and the engine speed signal is below the threshold value.

10. The agricultural machine of claim 9 further comprising:

user interface means for receiving an alarm off signal, the control means disabling the generation of the slip signal.

11. The agricultural machine of claim 7 further comprising:

a belt mechanically communicating with the engine and the rotor, the slip signal being indicative of slippage between the belt and the rotor or the belt and the engine.

12. The agricultural machine of claim 11 further comprising:

user interface means for receiving the sensitivity factor represented by a percentage value based on the rotor and wear of the belt the sensitivity factor being multiplied by a ratio of the engine speed signal under the no-load condition and the rotor speed signal under the no-load condition.

13. The agricultural machine of claim 12 wherein the agricultural machine is a combine.

14. A method of generating a slip warning signal for agricultural machinery including an engine indirectly driving a piece of equipment, the method comprising the steps of:

receiving an equipment speed signal indicative of an equipment speed of the piece of equipment;

receiving an engine speed signal indicative of an engine speed of the engine;

calculating a threshold value based on the engine speed signal under a no-load condition, the equipment speed signal under the no-load condition and a sensitivity factor;

generating the slip warning signal in response to the engine speed signal and the equipment speed signal compared to the threshold value; and adjusting the threshold value after generating the slip warning signal.

15. The method of claim 14 wherein the generating step includes dividing the equipment speed signal by the engine speed signal to generate a ratio.

16. The method of claim 14 wherein the method is performed by a software subroutine.

17. The method of claim 14 wherein the engine and the piece of equipment are indirectly coupled by a belt.

18. The method of claim 14, wherein the adjusting step includes increasing the threshold value after a first generation of the slip warning signal and not adjusting the threshold value after subsequent generations of the slip warning signal.

19. The method of claim 18, wherein the threshold value is increased in the range of two to six percent.

20. The method of claim 14, wherein the calculating step includes representing the sensitivity factor as a percentage value based on the piece of equipment and wear of at least one belt coupled to the piece of equipment, the sensitivity factor being multiplied by a ratio of the equipment speed signal under the no-load condition divided by the engine speed signal under the no-load condition.

* * * * *

UNITED STATES PATENT AND TRADEMARK OFFICE
CERTIFICATE OF CORRECTION

PATENT NO. : 5,855,108
DATED : January 5, 1999
INVENTOR(S) : Maury V. Salz et al.

It is certified that error appears in the above-identified patent and that said Letters Patent is hereby corrected as shown below:

On the cover page item 75 --Joseph N. Vogel, Davenport, Iowa-- as additional inventor of this patent. In claim 12, line 15, insert-- after "belt".

Signed and Sealed this

Twenty-fifth Day of May, 1999

Attest:

Q. TODD DICKINSON

Attesting Officer        Acting Commissioner of Patents and Trademarks

UNITED STATES PATENT AND TRADEMARK OFFICE
CERTIFICATE OF CORRECTION

PATENT NO. : 5,855,108
DATED : January 5, 1999
INVENTOR(S) : Maury V. Salz; Dale W. Panoushek; Eric L. Walker; Joseph N. Vogel.

It is certified that error appears in the above-indentified patent and that said Letters Patent is hereby corrected as shown below:

In claim 12, line 5, insert --,-- after "belt".

Signed and Sealed this

Seventh Day of September, 1999

Attest:

Q. TODD DICKINSON

Attesting Officer

Acting Commissioner of Patents and Trademarks